(12) United States Patent
Ito et al.

(10) Patent No.: US 6,187,445 B1
(45) Date of Patent: Feb. 13, 2001

(54) BIREFRINGENT PLATE

(75) Inventors: Tadayoshi Ito; Yasunori Taga; Motofumi Suzuki, all of Aichi (JP)

(73) Assignee: Kabushiki Kaisha Toyota Chuo Kenkyusho, Aichi-gun (JP)

( * ) Notice: Under 35 U.S.C. 154(b), the term of this patent shall be extended for 0 days.

(21) Appl. No.: 09/321,548

(22) Filed: May 28, 1999

(30) Foreign Application Priority Data

| May 29, 1998 | (JP) | 10-150340 |
| Apr. 28, 1999 | (JP) | 11-122558 |

(51) Int. Cl.[7] .................................................. B32B 9/00
(52) U.S. Cl. ......................... 428/426; 428/428; 428/432
(58) Field of Search .................................... 428/426, 428, 428/432

(56) References Cited

FOREIGN PATENT DOCUMENTS

| 1-312507 | 12/1989 | (JP) . |
| 9-296265 | 11/1997 | (JP) . |
| 9-297214 | 11/1997 | (JP) . |

*Primary Examiner*—Timothy M. Speer
(74) *Attorney, Agent, or Firm*—Oblon, Spivak, McClelland, Maier & Neustadt, P.C.

(57) ABSTRACT

A birefringent plate includes a transparent glass substrate, an antireflection coating formed on one of the surfaces of the glass substrate, an obliquely deposited film formed on the other one of the surfaces of the glass substrate by obliquely deposition of a dielectric material with respect to the normal of the glass substrate, and a protective film formed on the obliquely deposited film for holding the occluded water of the obliquely deposited film within the obliquely deposited film and reducing the light interference between the opposite surface of the glass substrate and the surface of the obliquely deposited film. The antireflection coating and the protective film inhibit the phase difference from fluctuating at different measurement positions when the phase difference is measured by using a light source, such as a laser beam. In addition, the protective film makes the birefringent plate less dependent on the temperature.

14 Claims, 5 Drawing Sheets

BIREFRINGENT PLATE

BACKGROUND OF THE INVENTION

1. Field of the invention

The present invention relates to a birefringent plate. The birefringent plate is utilized as an optically functional device, such as a ¼-wavelength phase-difference plate and a ½-wavelength phase-difference plate, in a pick-up for a CD-ROM player or a DVD player.

2. Description of the Related Art

A birefringent plate has been used conventionally. In the birefringent plate, an obliquely deposited film is formed on a transparent glass substrate, and is made from a dielectric material, such as oxide, sulfide and fluoride, which is transparent in the visible light to the near-infrared region. The "obliquely deposition" herein means a method to form a film on a substrate surface which is inclined with respect to the flying direction of a depositing material. The structure of the obliquely deposited film is observed as a columnar structure which has an assembly of fine columns. The fine columns have circular cross-sections, and are inclined at a definite predetermined angle with respect to the surface of the substrate. The density of the columns exhibits anisotropy in a plane, and the refractive index exhibits anisotropy in a plane. As a result, the obliquely deposited film effects the birefringence. By utilizing the birefringence of the obliquely deposited film, the birefringent plate is applied to optical devices, such as a ¼-wavelength phase-difference plate and a ½-wavelength phase-difference plate.

One of the problems associated with the obliquely-deposited birefringent plate is that the phase difference varies because of a change of the refractive index in accordance with an amount of the water which is occluded in the obliquely deposited film. The birefringent refractive index of the obliquely deposited film depends on the packed rate of the columnar structure and the refractive index of the columns and the substance occupying the spaces, etc. It is known that the birefringent refractive index of the obliquely deposited film nearly monotonously decreases when the refractive index of the substance occupying the spaces enlarges. For example, when all of the substance occupying the spaces is water whose refractive index n is 1.33 (i.e., n=1.33), the birefringent refractive index is reduced by half with respect to the case where all of the substance occupying the spaces is air whose refractive index n is 1.0 (i.e., n=1.0).

Tantalum pentoxide ($Ta_2O_5$) is one of the film materials which are often used for the obliquely deposited birefringent plate. Immediately after the preparation, a $Ta_2O_5$ obliquely deposited film is reduced to exhibit liver brown, but is turned into transparent by carrying out a bleaching (oxidation) treatment. The bleaching treatment is carried out in a dry-air atmosphere whose temperature is 90° C. or less, or in a highly-humid atmosphere whose relative humidity is 85% or less. Thereafter, the $Ta_2O_5$ obliquely deposited film is left in a constant temperature-and-humidity atmosphere, for example, at 25° C. and in a relative humidity of 60%.

As earlier mentioned, the obliquely deposited film is composed of the columnar structure of a low density (a packed rate of from 70% to 80%), and has spaces in an amount of from 20% to 30% by volume. In the bleaching step and under the constant temperature-and-humidity atmosphere, a large amount of water is adsorbed and occluded in the spaces of the obliquely deposited film. This phenomenon was confirmed by an infrared spectroscopy analysis. The amount of the occluded water is saturated when water is adsorbed in all of the spaces of the columnar structure. The amount of the occluded water in the obliquely deposited film varies in accordance with the temperature. When the obliquely deposited film is exposed to an atmosphere of 100° C. or more, the occluded water evaporates. Accordingly, air is the main component occupying the spaces. When the temperature is decreased to room temperature, the obliquely deposited film retrieves the water vapor in air. Then, the amount of the occluded water is recovered to the original amount.

Thus, the occluded water comes in and out of the obliquely deposited film in accordance with the temperature. Consequently, when the amount of the occluded water varies in the obliquely deposited film in accordance with the temperature, the refractive index of the substance occupying the spaces changes. As a result, the birefringent refractive index of the obliquely deposited film varies so that the phase difference fluctuates.

Japanese Unexamined Patent Publication (KOKAI) No. 1-312,507 discloses a countermeasure to the problem. For instance, a transparent resin, such as an epoxy resin, is injected into the spaces in the columnar structure, thereby improving the temperature and moisture characteristics of the obliquely deposited film. In this method, however, since the injected resin exhibits a high refractive index, the birefringent refractive index of the resulting birefringent plate decreases greatly. As a result, it is necessary to thicken the obliquely deposited film in order to obtain desired characteristics.

Another one of the problems associated with the obliquely-deposited birefringent plate is that the phase difference fluctuates depending on the measurement positions within the identical substrate when the phase difference was examined with a coherent light source, for example, a laser beam despite the fact that the characteristics of the obliquely deposited film, such as the film thickness and the birefringent refractive index, are constant. This phenomenon does not occur when an incoherent light is spectroscopically separated and is used as a light source. This is an adverse characteristic when a monochromatic light, such as a laser beam, is used as a light source.

Usually, the distribution of the phase difference is periodic. For instance, in a glass substrate of 5 cm×5 cm in size, the phase difference fluctuates by 10 deg. or more in a certain case. When the obliquely-deposited birefringent plate is used as a ¼-wavelength phase-difference plate or a ½-wavelength phase-difference plate, the fluctuation of the phase difference results in a decreased yield of product and a remarkably increased cost because it is necessary to inspect every single device of 3 mm×3 mm in size.

Since the distribution of the phase difference occurs periodically, one of the causes of the fluctuation of the phase difference is considered to be the uneven thickness-wise inclination of the glass substrate. Normally, as for a substrate used in the obliquely deposited birefringent plate, a flat glass substrate having a surface roughness of 20 Å or less is used. When the irregularity is large on the surfaces, the resulting obliquely deposited film whitens because the diameters of the columns enlarge. Regarding the flat glass substrate, a float glass substrate and a polished glass substrate have been known. However, in these glass substrates as well, there arise uneven thickness-wise inclinations which are equivalent to the wavelength of a laser beam.

Generally, it is possible to reduce the flatness of the surfaces of a glass substrate sufficiently less than the wavelength of a light. However, it is difficult to keep the parallelism between the front and opposite surfaces which is the thickness of a glass substrate of a large area. Whilst, it is relatively easy to make the thickness of the obliquely deposited film even by optimizing the geometric arrangement of the deposition. Accordingly, as illustrated in FIG. 8, the cross-section of an actual obliquely deposited film is made in such a manner that an obliquely deposited film of an even thickness is formed on a glass substrate whose size is a couple of centimeters and which has a thickness inclination nearly equal to the wavelength of a light.

When a highly coherent light, such as a laser beam, enters the thus constructed obliquely deposited birefringent film, the light interference occurs not only in the obliquely deposited film but also between the opposite surface of the glass substrate and the surface of the obliquely deposited film. The phase-difference distribution is caused in a plane of the birefringent plate by the light interference between the opposite surface of the glass substrate and the surface of the obliquely deposited film.

Figure 8:
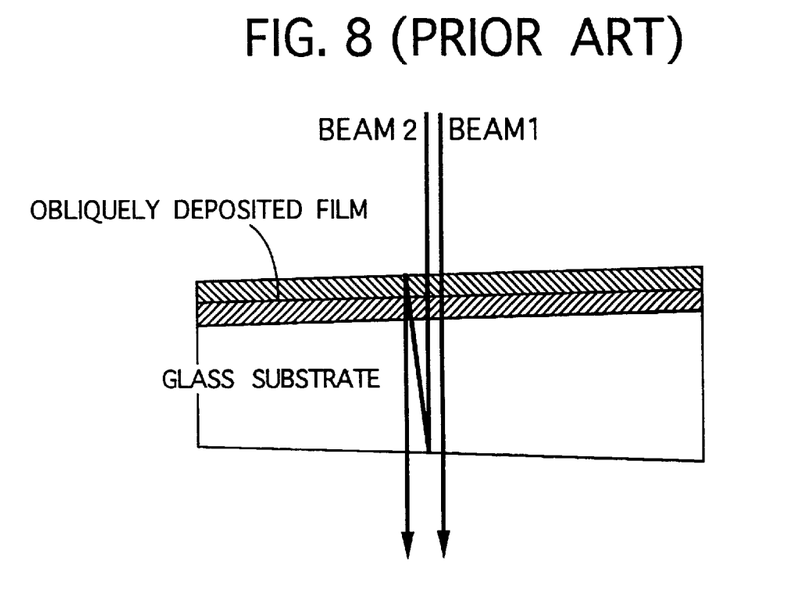
FIG. 8 is a cross-sectional view for illustrating the light interference between the surface of an obliquely deposited film and the opposite surface of a glass substrate.

Namely, as illustrated in FIG. 8, the actually observed light is the superimposition of a beam 1 and a beam 2 which pass in the obliquely deposited film exhibiting the birefringence. For example, the beam 1 influences the beam 2 differently in the case where the effective optical thickness, the summed thickness of the obliquely deposited film and the glass substrate, is $(2m+1)\lambda/2$ from in the case where it is $(2m+1)\lambda/4$.

Accordingly, when the glass substrate has a definite predetermined thickness inclination as illustrated in FIG. 8, the phase difference varies periodically as the phase difference is measured along the direction of the inclination. Likewise, when the glass substrate has irregular thicknesses, the phase-difference distribution is observed in a plane.

The phase difference varies as aforementioned when the following 4 conditions are overlapped: 1) when the obliquely deposited film exhibits a high refractive index; 2) when the glass substrate has the periodic thickness inclination; 3) when the incident light reflects at the opposite surface of the glass substrate; and 4) when the measuring light source is a highly coherent laser beam. If a birefringent plate is constituted by an obliquely deposited film which is made by using $SiO_2$ or $MgF_2$ exhibiting a low refractive index, the problem can be solved to a certain extent. However, $SiO_2$ and $MgF_2$ cannot be used in optically functional component parts, such as a ¼-wavelength phase-difference plate, because they exhibit a small birefringent refractive index and whiten. On the other hand, a $Ta_2O_5$ obliquely deposited film does not whiten, but exhibits a large birefringent refractive index. However, $Ta_2O_5$ exhibits a refractive index of 1.86, and produces an interference reflection of 10.7%. Moreover, it is difficult to eliminate the periodic thickness inclination of the glass substrate by ordinary methods for forming the glass substrate.

SUMMARY OF INVENTION

The present invention has been developed in order to solve the aforementioned problems of the birefringent plate made by forming the obliquely deposited film on the glass substrate. It is therefore an object of the present invention to provide an obliquely deposited birefringent plate whose phase difference is less dependent on the temperature, and whose phase-difference distribution is less likely to fluctuate in a plane even when a highly coherent light source, such as a laser beam, is used.

The inventors of the present invention discovered that the aforementioned disadvantages can be solved by reducing the reflection at the opposite surface of the glass substrate and by forming a protective film which is formed on an obliquely deposited film to hold the occluded water of the obliquely deposited film within the obliquely deposited film, or alternatively a protective film which reduces the light interference between the opposite surface of the glass substrate and the surface of the obliquely deposited film in addition to the occluded-water holding function. Thus, the inventors completed the present invention.

A birefringent plate according to a first aspect of the present invention comprises:
  a transparent glass substrate;
  an obliquely deposited film formed on one of the surfaces of the glass substrate by obliquely deposition of a dielectric material with respect to the normal of the glass substrate; and
  a protective film formed on the obliquely deposited film for holding the occluded water of the obliquely deposited film within the obliquely deposited film.

A birefringent plate according to a second aspect of the present invention comprises:
  a transparent glass substrate;
  an obliquely deposited film formed on one of the surfaces of the glass substrate by obliquely deposition of a dielectric material with respect to the normal of the glass substrate; and
  a protective film formed on the obliquely deposited film for holding the occluded water of the obliquely deposited film within the obliquely deposited film and reducing the light interference between the opposite surface of the glass substrate and the surface of the obliquely deposited film.

A birefringent plate according to a third aspect of the present invention comprises:
  a transparent glass substrate;
  an antireflection coating formed on one of the surfaces of the glass substrate;
  an obliquely deposited film formed on the other one of the surfaces of the glass substrate by obliquely deposition of a dielectric material with respect to the normal of the glass substrate; and
  a protective film formed on the obliquely deposited film for holding the occluded water of the obliquely deposited film within the obliquely deposited film.

A birefringent plate according to a fourth aspect of the present invention comprises:
  a transparent glass substrate;
  an antireflection coating formed on one of the surfaces of the glass substrate;
  an obliquely deposited film formed on the other one of the surfaces of the glass substrate by obliquely deposition of a dielectric material with respect to the normal of the glass substrate; and
  a protective film formed on the obliquely deposited film for holding the occluded water of the obliquely deposited film within the obliquely deposited film and reducing the light interference between the opposite surface of the glass substrate and the surface of the obliquely deposited film.

A birefringent plate according to a fifth aspect of the present invention comprises:
  a transparent glass substrate;
  an antireflection coating formed on one of the surfaces of the glass substrate; and
  an obliquely deposited film formed on the other one of the surfaces of the glass substrate by obliquely deposition of a dielectric material with respect to the normal of the glass substrate.

In the birefringent plates according to the first, second, third and fourth aspects of the present invention, the protective film is applied on the obliquely deposited film. As a result, it is possible to manufacture an obliquely deposited birefringent plate whose phase difference is less dependent on the temperature. In particular, in the birefringent plate according to the second or fourth aspect of the present invention, the protective film reduces the light interference between the opposite surface of the glass substrate and the surface of the obliquely deposited film so that the phase difference is effectively inhibited from fluctuating at the measurement positions.

Moreover, in the birefringent plates according to the third, fourth and fifth aspects of the present invention, the antireflection coating is formed on one of the surfaces (e.g., the opposite surface) of the glass substrate. In particular, in the birefringent plate according to the fourth aspect of the present invention, in addition to the antireflection coating, the protective film is applied on the obliquely deposited film to reduce the light interference between the opposite surface of the glass substrate and the surface of the obliquely deposited film. As a result, even when the phase difference of the birefringent plates is measured with a light source, such as a laser beam, the phase difference is furthermore effectively inhibited from fluctuating at the measurement positions.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

In the first aspect of the present invention, the protective film is formed on the obliquely deposited film for holding the occluded water of the obliquely deposited film within the obliquely deposited film. Accordingly, even when the birefringent plate is heated to 100° C. or more, the occluded water contained in the obliquely deposited film does not evaporate. Hence, the birefringent refractive index can be kept constant, and the phase difference little fluctuates in accordance with the temperature.

In the second aspect of the present invention, the protective film holds the occluded water contained in the obliquely deposited film within the obliquely deposited film. Accordingly, the phase difference does not fluctuate in accordance with the temperature. Simultaneously, the protective film functions to reduce the light interference between the opposite surface of the glass substrate and the surface of the obliquely deposited film. Consequently, the evenness can be remarkably improved in the phase difference when the phase difference is measured by using a light source, such as a laser beam. In order to obtain this advantage, the protective film can employ not only a single-layered construction but also a more than one multi-layered construction.

In the case of the single-layered construction, a low refractive-index material which exhibits an optical film thickness $(2m-1)\lambda/4$ in which $m=1-5$ is formed on the surface of the obliquely deposited film. For example, the low refractive index n herein falls in the range of from 1.25 to 1.45 (i.e., n=1.25–1.45). The low refractive-index material can be fluorocarbon, such as polytetrafluoroethylene (hereinafter abbreviated to as "PTFE"), furan, NaF, $MgF_2$, $CaF_2$ and $SiO_2$. Here, $\lambda$ is the wavelength of a used laser beam. Note that it is preferable to select a material of high mechanical strength as the low refractive-index material to be formed on the obliquely deposited film.

In the case of the two-layered construction, on the surface of the obliquely deposited film, there are formed a high refractive-index material, which exhibits an optical film thickness $\lambda/2$ and whose refractive index falls in the range of from 2.0 to 2.4 (i.e., n=2.0–2.4), and a low refractive-index material, which exhibits an optical film thickness $(2m-1)\lambda/4$ in which $m=1-5$ and whose refractive index falls in the range of from 1.25 to 1.45 (i.e., n=1.25–1.45). The low refractive-index material can be PTFE, furan, NaF, $MgF_2$, $CaF_2$ and $SiO_2$. The high refractive-index material can be $Ta_2O_5$, $ZrO_2$, $CeO_2$ and $TiO_2$. In the case of the two-layered construction, the characteristics can be furthermore enhanced when the optical film thickness of the obliquely deposited film is set at $m\lambda/4$. Here, $\lambda$ is the wavelength of a used laser beam. Note that the low refractive-index materials whose refractive indices are n=1.25–1.45 can be combined as a multi-layered including the two-layered construction to form the protective film. If such is the case, the optical film thicknesses of the multi-layered low refractive-index materials are set in total at $(2m-1)\lambda/4$ in which $m=1-5$. Here, $\lambda$ is the wavelength of a used laser beam.

In the third aspect of the present invention, the antireflection coating reduces the reflection at the opposite surface of the glass substrate. Accordingly, the evenness can be remarkably improved in the phase difference when the phase difference is measured by using a light source, such as a laser beam. Moreover, the protective film is applied on the obliquely deposited film, and inhibits the occluded water of the obliquely deposited film from evaporating. Hence, even when the temperature of the birefringent plate is increased, the birefringent refractive index can be kept at a constant value, and the phase difference little fluctuates in accordance with the temperature. The protective film can employ not only a single layered construction but also a more than one multi-layered construction.

In the fourth aspect of the present invention, the antireflection coating reduces the reflection at the opposite surface of the glass substrate, and the protective film functions to reduce the light interference between the opposite surface of the glass substrate and the surface of the obliquely deposited film. Accordingly, the evenness can be remarkably improved in the phase difference when the phase difference is measured by using a light source, such as a laser beam. Moreover, similarly to the third aspect of the present invention, the protective film holds the occluded water contained in the obliquely deposited film within the obliquely deposited film. Consequently, the phase difference does not fluctuate in accordance with the temperature. In order to obtain these advantages, the protective film can employ not only a single-layered construction but also a more than one multi-layered construction.

In the fifth aspect of the present invention, the antireflection coating is applied on one of the surfaces of the transparent glass substrate, and can be either a single-layered or a multi-layered construction. In this structure, the reflection is reduced sharply at the opposite surface of the glass substrate. Accordingly, the evenness can be remarkably improved in the phase difference when the phase difference is measured by using a light source, such as a laser beam. However, when the temperature is increased to 100° C. or more, the birefringent refractive index increases because the occluded water contained in the obliquely deposited film evaporates.

The antireflection coating, which is formed on one of the surfaces of the transparent glass substrate, can be formed by the methods, which have been known conventionally. For example, when the antireflection coating employs a three-layered construction, $Al_2O_3$, $ZrO_2$ and $MgF_2$ are laminated in this order starting from one of the surfaces of the substrate, and are formed so as to have optical thicknesses of $\lambda/4$, $\lambda/2$ and $\lambda/4$, respectively.

The dielectric material, which is obliquely deposited on the other one of the surfaces of the glass substrate, is not limited in particular as far as it is transparent in the visible light to the near-infrared region and exhibits birefringence. For example, as the dielectric material, it is possible to employ tantalum pentoxide ($Ta_2O_5$), bismuth trioxide ($Bi_2O_3$), cerium dioxide ($CeO_2$) and titanium dioxide ($TiO_2$). Known methods are employed to form the obliquely deposited film. For instance, it is possible to employ an electron-beam deposition method and a sputtering method.

The obliquely deposited film is formed on the surface of the transparent glass substrate by obliquely depositing of the dielectric material, for example, in the oblique direction of from 60 deg. to 80 deg., with respect to the normal of the substrate. The deposition angle and the thickness of the obliquely deposited film can be determined appropriately to grow the columnar structure so that a sufficient birefringent refractive index can be obtained. Note that, when the oblique deposition is carried out in one direction, the distribution arises in the film thickness so that the phase difference fluctuates. Accordingly, in order to make the distribution of the film thickness even, a repetitive deposition is employed in which the obliquely deposited film is formed in the two directions by turning the substrate by 180 deg. as disclosed in Japanese Unexamined Patent Publication (KOKAI) No. 63-132,203.

The protective film, which is formed on the surface of the obliquely deposited film, functions not only to keep the occluded water in the obliquely-deposited film from evaporating but also simultaneously to reduce the light interference between the opposite surface of the glass substrate and the surface of the obliquely deposited film. The following are the conditions of the protective film satisfied with both of the functions:

1) the protective film is made from a material having a blocking effect against the water molecules and the water vapor;
2) the protective film is made from a material which fills up the fine irregularity in the surface of the obliquely deposited film, and which exhibits favorable adhesion to the obliquely deposited film;
3) the protective film is made from a low refractive-index material (e.g., n=1.25–1.45); and
4) the protective film is made from a material which exhibits a small internal stress and which hardly gives damages to the obliquely deposited film, and is made by a process which hardly gives damages to the obliquely deposited film.

The film-forming materials, which satisfy these conditions relatively well, can be PTFE, furan, NaF, $CaF_2$, $MgF_2$ and $SiO_2$. The film structure can be formed not only as a single-layered construction but also as a more than one multi-layered construction. By forming the multi-layered protective film, the functions can be enhanced. Specifically, a first film, which is made from a material exhibiting a favorable adhesion to the obliquely deposited film, is formed on the obliquely deposited film, and thereafter a second film is formed on the first film with a substance, which exhibits a blocking effect against the water molecules and the water vapor. When the protective film is formed free from pin holes, and even when the protective film has a thickness of 100 nm only, the protective film fully inhibits the occluded water contained in the obliquely deposited film from evaporating. Note that, when the thickness of the protective film is adjusted to $(2m-1)\lambda/4$ in which m=1–5, the protective film not only inhibits the occluded water contained in the obliquely-deposited film from evaporating but also simultaneously reduces the light interference between the opposite surface of the glass substrate and the surface of the obliquely deposited film. Here, $\lambda$ is the wavelength of a used laser beam. Regarding the method for preparing the protective film, it is possible to employ sputtering, vacuum deposition, ion plating, plasma polymerization or CVD (chemical vapor deposition).

Here, $MgF_2$ is widely used as a material for forming an antireflection coating on a glass substrate. However, since $MgF_2$ exhibits a high mechanical strength, it is necessary to form its film on a substrate, which is heated to 250° C. or more, in order to prepare a film exhibiting a good spectroscopic characteristic. The thus prepared $MgF_2$ film exhibits a large internal stress. Namely, when the $MgF_2$ film is formed on a deposition film which exhibits a low mechanical strength, there arises a problem in that the $MgF_2$ film peels off or cracks in a certain occasion.

$SiO_2$ exhibits a satisfactory adhesion to the obliquely deposited film, and its film exhibits a small internal stress. However, since $SiO_2$ has a slightly large refractive index, it is slightly inferior in the function of reducing the light interference between the opposite surface of the glass substrate and the surface of the obliquely deposited film.

The polymer film, such as a PTFE film formed by a vacuum deposition method and a plasma-polymerized film made from furan, exhibits a low mechanical strength, and is inferior in the adhesion to the obliquely deposited film. However, since the polymer film exhibits a small internal stress and produces the blocking effect against the water molecules, it is provided with the favorable properties as the protective film.

As having described so far, in the present birefringent plate, the reflection is suppressed at the opposite surface of the glass substrate, and the protective film is applied on the obliquely deposited film. The fluctuation of the phase-difference distribution is suppressed in a plane even when the phase difference is measured by using a light source, such as a laser beam. Moreover, the phase difference little fluctuates even at elevated temperatures of 100° C. or more.

The preferred embodiments of the present birefringent plate will be hereinafter described with reference to the drawings.

First Preferred Embodiment

Figure 1:
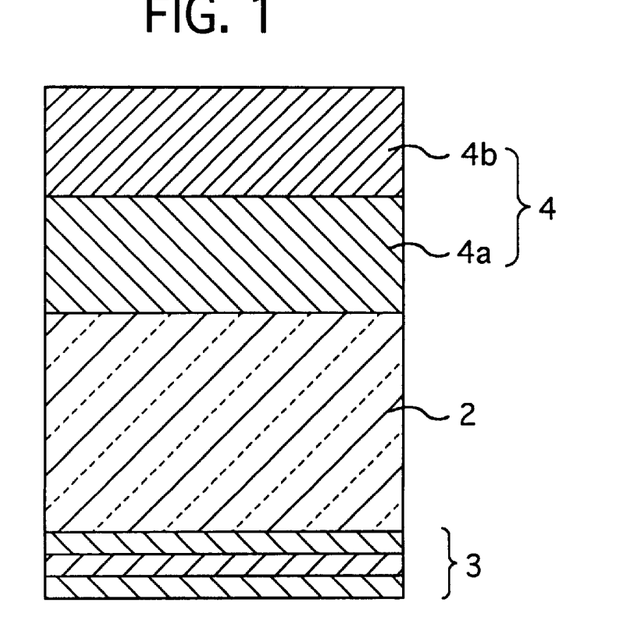
FIG. 1 is a cross-sectional view of Example No. 1 of a birefringent plate according to the present invention in which a three-layered antireflection coating is formed on the opposite surface of a glass substrate.

As illustrated in FIG. 1, a glass substrate 2, borosilicate crown glass of 5 cm×5 cm, was prepared. The glass substrate 2 was first washed with acetone, and was dried fully. Whilst, a four-source electron-beam deposition apparatus was prepared. The four-source electron-beam deposition apparatus working as a film-forming apparatus included an obliquely deposited film-forming jig in addition to an ordinary rotary jig. The glass substrate 2 was attached to the ordinary rotary jig. Then, the film-forming apparatus was evacuated to a vacuum of $1 \times 10^{-6}$ Torr. Thereafter, the glass substrate 2 was heated to a temperature of 300° C. or less. Then, $Al_2O_3$, $ZrO_2$ and $MgF_2$ were laminated in this order on a surface of the glass substrate 2, and were formed so as to have optical thicknesses of $\lambda/4$, $\lambda/2$ and $\lambda/4$, respectively to form a three-layered antireflection coating 3. Note that $\lambda$ was herein set at 780 nm.

Subsequently, the glass substrate 2 was removed from the film-forming apparatus. Then, the glass substrate 2 was washed again with acetone, and was dried fully. Thereafter, the glass substrate 2 was attached to the obliquely deposited film-forming jig in the film-forming apparatus. Then, the film-forming apparatus was evacuated to a vacuum of $1 \times 10^{-6}$ Torr. Thereafter, $Ta_2O_5$ was deposited in a thickness of 2,400 nm at room temperature on the other one of the surfaces of the glass substrate 2 at an obliquely deposition angle of 70 deg. with respect to the normal of the glass substrate 2, thereby forming an obliquely deposited film 4a. Then, the obliquely deposition angle was changed to −70 deg. with respect to the normal of the glass substrate 2, and $Ta_2O_5$ was further deposited in a thickness of 2,400 nm at room temperature on the surface of the obliquely deposited film 4a, thereby forming an obliquely deposited film 4b. Thus, a birefringent film was obtained which had a two-layered construction. This preferred embodiment is a birefringent plate which corresponds to the fifth aspect of the present invention and will be hereinafter referred to as Example No. 1.

Second Preferred Embodiment

Figure 2:
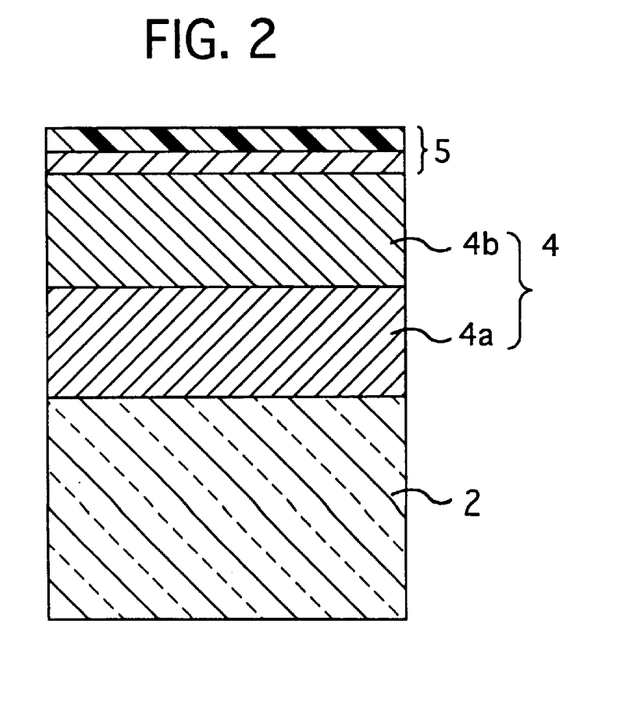
FIG. 2 is a cross-sectional view of Example No. 2 of a birefringent plate according to the present invention in which a protective film is disposed on an obliquely deposited film.

As illustrated in FIG. 2, a glass substrate 2 which was identical with that of the First Preferred Embodiment was prepared, and was washed with acetone. Then, the glass substrate 2 was attached to the obliquely deposited film-forming jig in the film-forming apparatus. Thereafter, the film-forming apparatus was evacuated to a vacuum of $1 \times 10^{-6}$ Torr. Then, $Ta_2O_5$ was deposited in a thickness of 2,400 nm at room temperature on one of the surfaces of the glass substrate 2 at an obliquely deposition angle of 70 deg. with respect to the normal of the glass substrate 2, thereby forming an obliquely deposited film 4a. Thereafter, the obliquely deposition angle was changed to −70 deg. with respect to the normal of the glass substrate 2, and $Ta_2O_5$ was further deposited in a thickness of 2,400 nm at room temperature on the surface of the obliquely deposited film 4a, thereby forming an obliquely deposited film 4b. Thus, a birefringent film was obtained which had a two-layered construction.

Subsequently, the glass substrate 2 was re-attached to the ordinary rotary jig in the film-forming apparatus. Then, the film-forming apparatus was evacuated. Thereafter, a protective film 5 was formed on the surface of the obliquely deposited film 4b. The protective film 5 was formed as a two-layered construction which was composed of a $Ta_2O_5$ film in a thickness of 195 nm and a PTFE film in a thickness of 150 nm. The protective film 5 was formed in order to hold the occluded water of the obliquely deposited film 4 within the obliquely deposited film 4 and to reduce the light interference between the opposite surface of the glass substrate 2 and the surface of the obliquely deposited film 4. This preferred embodiment is a birefringent plate which corresponds to the first or second aspect of the present invention and will be hereinafter referred to as Example No. 2. Note that it is unnecessary to limit the thickness of the protective film 5 when the protective film 5 functions as a simple protective film.

Third Preferred Embodiment

Figure 3:
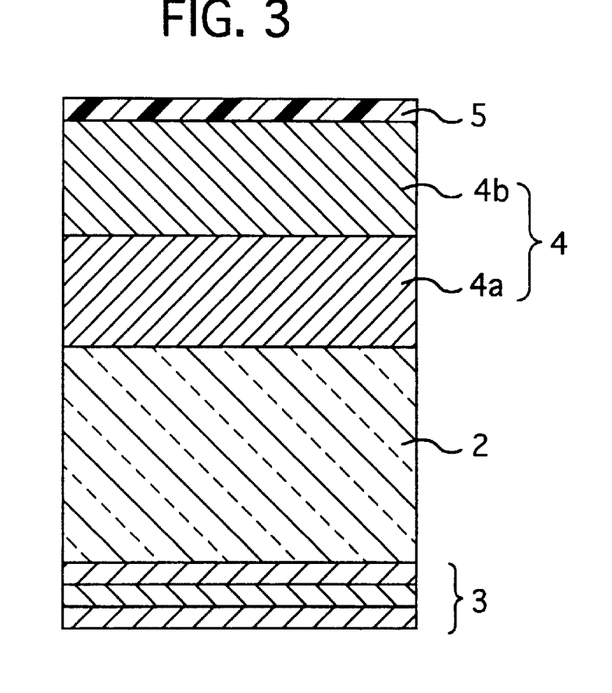
FIG. 3 is a cross-sectional view of Example No. 3 of a birefringent plate according to the present invention in which a three-layered antireflection coating is formed on the opposite surface of a glass substrate and a protective film is disposed on an obliquely deposited film.

As illustrated in FIG. 3, a glass substrate 2 which was identical with that of the First Preferred Embodiment was prepared. The glass substrate 2 was washed with acetone, and was dried fully. Thereafter, the glass substrate 2 was attached to the ordinary rotary jig in the film-forming apparatus. Then, the film-forming apparatus was evacuated to a vacuum of $1 \times 10^{-6}$ Torr. Thereafter, the glass substrate 2 was heated to a temperature of 300° C. or less. Then, $Al_2O_3$, $ZrO_2$ and $MgF_2$ were laminated in this order on a surface of the glass substrate 2, and were formed so as to have optical thicknesses of $\lambda/4$, $\lambda/2$ and $\lambda/4$, respectively. Thus, a three-layered antireflection coating 3 was formed. Note that $\lambda$ was herein set at 780 nm.

Subsequently, the glass substrate 2 was removed from the film-forming apparatus. Then, the glass substrate 2 was washed again with acetone, and was dried fully. Thereafter, the glass substrate 2 was attached to the obliquely deposited film-forming jig in the film-forming apparatus. Then, the film-forming apparatus was evacuated to a vacuum of $1 \times 10^{-6}$ Torr. Thereafter, $Ta_2O_5$ was deposited in a thickness of 2,400 nm at room temperature on the other one of the surfaces of the glass substrate 2 at an obliquely deposition angle of 70 deg. with respect to the normal of the glass substrate 2, thereby forming an obliquely deposited film 4a. Then, the obliquely deposition angle was changed to −70 deg. with respect to the normal of the glass substrate 2, and $Ta_2O_5$ was further deposited in a thickness of 2,400 nm at room temperature on the surface of the obliquely deposited film 4a, thereby forming an obliquely deposited film 4b. Thus, a birefringent film was obtained which had a two-layered construction.

Still subsequently, the glass substrate 2 was re-attached to the ordinary rotary jig in the film-forming apparatus. Then, the film-forming apparatus was evacuated. Thereafter, a protective film 5, a PTFE film, was formed in a thickness of 150 nm on the surface of the obliquely deposited film 4b. The protective film 5 was formed in order to hold the occluded water of the obliquely deposited film 4 within the obliquely deposited film 4 and to reduce the light interference between the opposite surface of the glass substrate 2 and the surface of the obliquely deposited film 4. This preferred embodiment is a birefringent plate which corresponds to the third or fourth aspect of the present invention and will be hereinafter referred to as Example No. 3.

COMPARATIVE EXAMPLE

Figure 4:
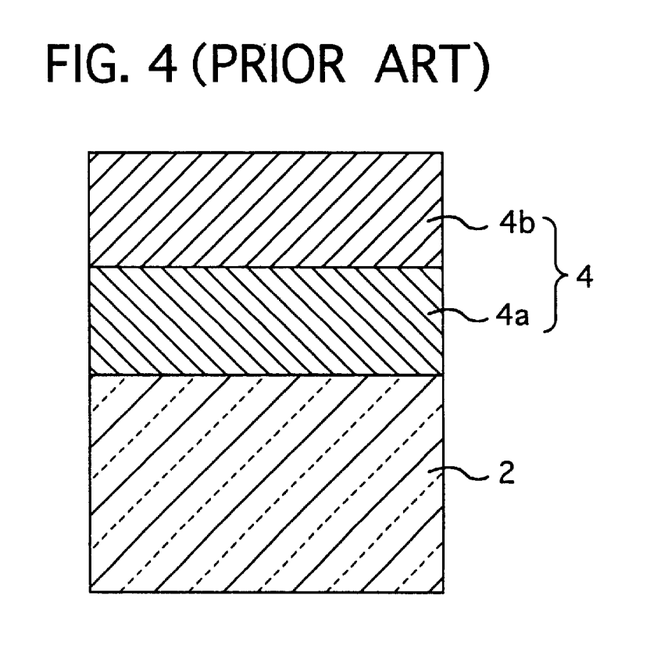
FIG. 4 is a cross-sectional view of Example No. 4 of a conventional birefringent plate in which only an obliquely deposited film is disposed on a glass substrate.

As illustrated in FIG. 4, a glass substrate 2 which was identical with that of the First Preferred Embodiment was prepared. The glass substrate 2 was washed with acetone, and was dried fully. Then, the glass substrate 2 was attached to the obliquely deposited film-forming jig of the film-forming apparatus. Thereafter, the film-forming apparatus was evacuated to a vacuum of $1 \times 10^{-6}$ Torr. Then, $Ta_2O_5$ was deposited in a thickness of 2,400 nm at room temperature on one of the surfaces of the glass substrate 2 at an obliquely deposition angle of 70 deg. with respect to the normal of the glass substrate 2, thereby forming an obliquely deposited film 4a. Thereafter, the obliquely deposition angle was changed to −70 deg. with respect to the normal of the glass substrate 2, and $Ta_2O_5$ was further deposited in a thickness of 2,400 nm at room temperature on the surface of the obliquely deposited film 4a, thereby forming an obliquely deposited film 4b. Thus, a birefringent film was obtained which had a two-layered construction. This birefringent plate is a comparative example, which was provided with the obliquely deposited film 4 only, and will be hereinafter referred to as Example No. 4.

(Performance Comparison Test)

In order to examine the temperature dependencies of the thus prepared four birefringent plates, the birefringent plates were measured for the phase differences (deg.) by using an ellipsometer. As for the light source employed herein, a continuous light was separated spectroscopically. The measurements were carried out at 2 levels, namely, at room temperature and at 100° C. The birefringent refractive indices were calculated from the resulting phase differences (deg.) by using the following equation:

Birefringent Refractive Index $(\Delta n) = \lambda/d$ in which $\lambda$ is the phase difference (nm), d is the film thickness (nm), and the phase difference (nm) equals the phase difference (deg.)/360×780.

Figure 7:
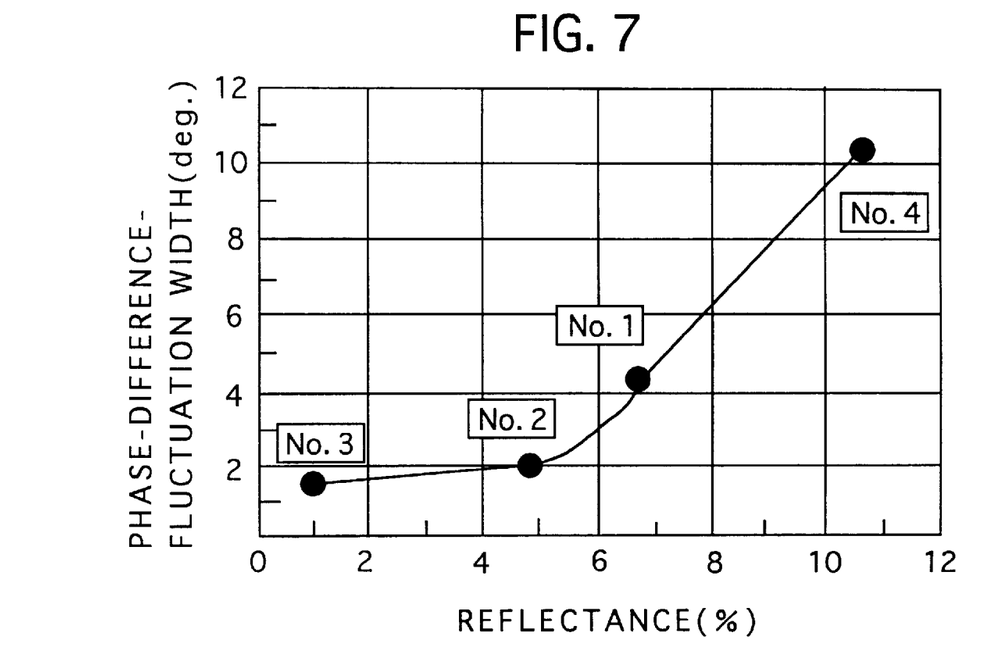
FIG. 7 is a diagram for illustrating the relationships between the reflectances and the phase-difference-fluctuation widths exhibited by Example Nos. 1 through 3 of the present birefringent plate and Example No. 4 of the conventional birefringent plate.

The four birefringent plates were also examined for the distributions of the phase differences (deg.) in a plane by using an ellipsometer. The measurements were carried out in the X-axis direction of the birefringent plates (i.e., in the direction perpendicular to the deposition direction) at intervals of 2.5 mm (or 5 mm). In addition, in order to investigate the relationships between the distributions of the phase differences (deg.) in a plane and the reflectances which were exhibited by the four birefringent plates, the four birefringent plates were measured for the spectral reflectance characteristics by using a visible light. The reflectances were average values which were obtained by measuring with the length of 780±20 nm at intervals of 5 nm. Table 2 and FIG. 7 show the relationships between the fluctuation widths of the phase differences (deg.) in the X-axis direction and the reflectances exhibited by the four birefringent plates. Here, the fluctuation widths of the phase differences (deg.) were obtained by subtracting the minimum phase-difference values from the maximum phase-difference values.

TABLE 1

| Identification | Phase Difference at Room Temp. (deg.) | Phase Difference at 100° C. (deg.) |
| --- | --- | --- |
| Example No. 1 | 99.0 | 104.8 |
| Example No. 2 | 98.6 | 98.8 |
| Example No. 3 | 97.9 | 98.0 |
| Example No. 4 | 100.5 | 105.6 |

TABLE 2

| Identification | Phase-Difference-Fluctuation Width (deg.) | Reflectance (%) |
| --- | --- | --- |
| Example No. 1 | 4.2 | 6.7 |
| Example No. 2 | 2.0 | 4.9 |
| Example No. 3 | 1.5 | 1.0 |
| Example No. 4 | 10.3 | 10.7 |

(Reduction in Temperature Dependencies in Birefringent Plates)

Figure 5:
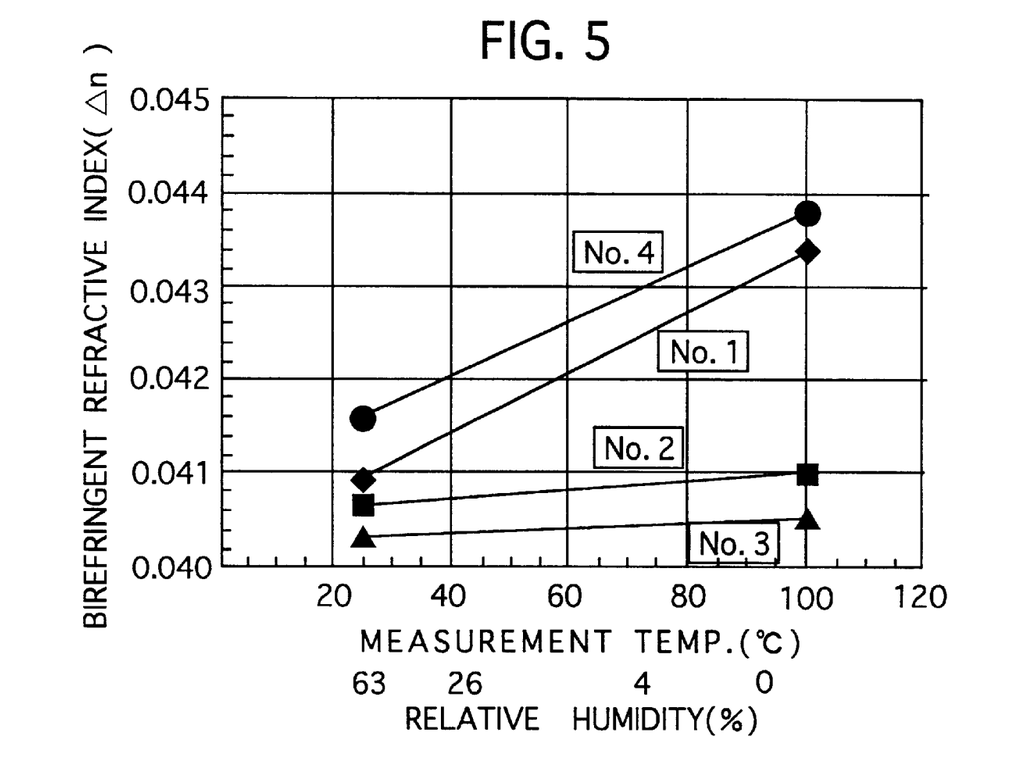
FIG. 5 is a diagram for illustrating the temperature dependencies of the birefringent refractive indices ($\Delta n$) exhibited by Example Nos. 1 through 3 of the present birefringent plate and Example No. 4 of the conventional birefringent plate.

Following are apparent from Table 1 and FIG. 5: the birefringent plates had no protective film applied on the obliquely deposited film 4 (e.g., Example Nos. 1 and 4) exhibited the phase-difference increment of about 5 deg., respectively, and the birefringent refractive indices increased by a couple of % with the temperature change of from room temperature to 100° C.; whereas the birefringent plates which were provided with the protective film 5 applied on the obliquely deposited film 4 (e.g., Example Nos. 2 and 3) hardly exhibited the phase-difference increment even when the temperature was elevated to 100° C., and the birefringent refractive indices were held at constant substantially. These results imply that the protective film 5 inhibited the occluded water contained in the obliquely deposited film 4 from evaporating even at 100° C. and the refractive indices were kept constant at the spaces in the obliquely deposited film 4. Thus, it is now possible to prepare a birefringent plate, which is less dependent on the temperature, by applying the protective film on the obliquely deposited film.

(Reduction in Phase-Difference Distribution in Birefringent Plates)

Figure 6:
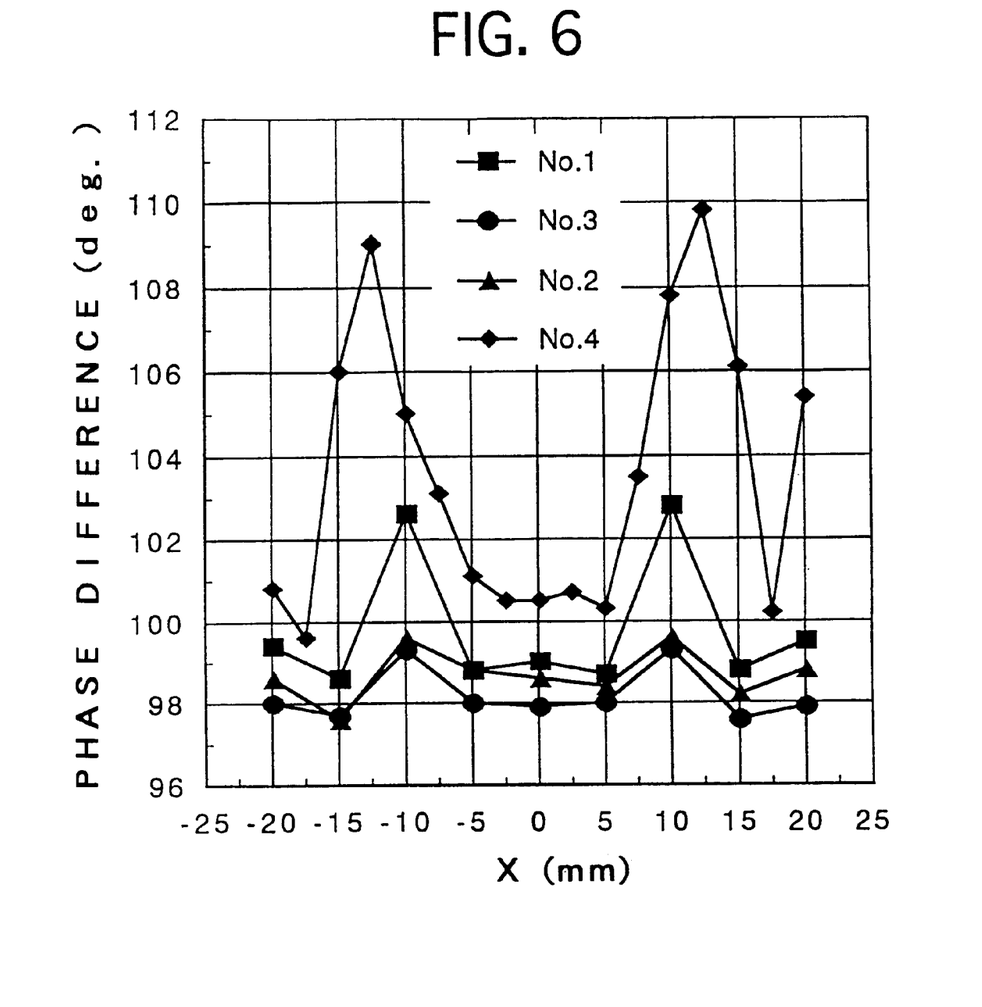
FIG. 6 is a diagram for illustrating the phase-difference distributions in a plane exhibited by Example Nos. 1 through 3 of the present birefringent plate and Example No. 4 of the conventional birefringent plate.

It is understood from FIG. 6 that the phase difference of the conventional birefringent plate (Example No. 4) was fluctuated greatly at different measurement positions. As earlier mentioned, in order to suppress the fluctuation of the phase-difference distribution in a plane of the birefringent plate, it was considered effective to reduce the reflection at the opposite surface of the glass substrate 2 or to reduce the reflectance at the surface of the obliquely deposited film 4. The birefringent plate (Example No. 1) in which the three-layered antireflection coating 3 was applied on the opposite surface of the glass substrate 2, the birefringent plate (Example No. 2) in which the protective film 5, functioning to reduce the light interference between the opposite surface of the glass substrate 2 and the surface of the obliquely deposited film 4, was applied on the surface of the birefringent film 4, and the birefringent plate (Example No. 3) in which the three-layered antireflection coating 3 was applied on the opposite surface of the glass substrate 2 and the protective film 5, functioning to reduce the light interference between the opposite surface of the glass substrate 2 and the surface of the obliquely deposited film 4, was further applied on the surface of the obliquely deposited film 4, were measured for the reflectances. Example Nos. 1, 2 and 3 exhibited the reflectances of 6.7%, 4.9% and 1.0%, respectively, which were reduced greatly with respect to the reflectance of 10.7% exhibited by the conventional birefringent plate (Example No. 4). Note that Example No. 3 exhibited the particularly small reflectance.

Whilst, the preferred embodiments of the present invention were examined for the phase-difference-fluctuation widths by using a laser beam. Example No. 1 exhibited the phase-difference-fluctuation width of 4.2 deg. Example No. 2 exhibited the phase-difference-fluctuation width of 2.0 deg. Example No. 3 exhibited the phase-difference-fluctuation width of 1.5 deg. All of them exhibited the phase-difference-fluctuation widths which were reduced sharply with respect to the phase-difference-fluctuation width of 10.3 deg. exhibited by the conventional birefringent plate (Example No. 4). In particular, in Example No. 3, a substantial phase-difference distribution was hardly appreciated in a plane. These results clearly show that the fluctuation of the phase difference of the birefringent plate corresponds to the reflectance of the birefringent plate explicitly (see FIG. 7.). Namely, it can be verified that the phase-difference-fluctuation width of the birefringent plate can be decreased remarkably by reducing the reflectance at the opposite surface of the glass substrate 2 and by reducing the light interference between the opposite surface of the glass substrate 2 and the surface of the obliquely deposited film 4. Thus, the advantages of the present invention are clearly presented.

Having now fully described the present invention, it will be apparent to one of ordinary skill in the art that many changes and modifications can be made thereto without departing from the spirit or scope of the present invention as set forth herein including the appended claims.

What is claimed is:

1. A birefringent plate, comprising:

a transparent glass substrate;

an obliquely deposited film formed on one of the surfaces of said glass substrate by oblique deposition of a dielectric material with respect to the normal of said glass substrate, and occluding water therein; and a protective film formed on the obliquely deposited film for holding the occluded water of said obliquely deposited film within said obliquely deposited film.

2. The birefringent plate according to claim 1, wherein said protective film further reduces the light interference between the opposite surface of said glass substrate and the surface of said obliquely deposited film.

3. The birefringent plate according to claim 2, wherein said protective film is formed as a single-layered construction including a low refractive-index material which exhibits an optical film thickness $(2m-1)\lambda/4$ in which $m=1-5$ and $\lambda$ is the wavelength of a laser beam used for a phase-difference measurement.

4. The birefringent plate according to claim 3, wherein said low refractive-index material is at least one member selected from the group consisting of fluorocarbon, furan, NaF, $MgF_2$, $CaF_2$ and $SiO_2$.

5. The birefringent plate according to claim 2, wherein said protective film is formed as a more than one multi-layered construction including a high refractive-index material, which exhibits an optical film thickness $\lambda/2$ in which $\lambda$ is the wavelength of a laser beam used for a phase-difference measurement, and a low refractive-index material, which exhibits an optical film thickness $(2m-1)\lambda/4$ in which $m=1-5$ and $\lambda$ is the wavelength of a laser beam used for a phase-difference measurement.

6. The birefringent plate according to claim 5, wherein said high refractive-index material is at least one member selected from the group consisting of $Ta_2O_5$, $ZrO_2$, $CeO_2$ and $TiO_2$, and said low refractive-index material is at least one member selected from the group consisting of fluorocarbon, furan, NaF, $MgF_2$, $CaF_2$ and $SiO_2$.

7. A birefringent plate, comprising:

a transparent glass substrate;

an antireflection coating formed on one of the surfaces of said glass substrate; and an obliquely deposited film formed on the other one of the surfaces of said glass substrate by oblique deposition of a dielectric material with respect to the normal of said glass substrate, and occluding water therein.

8. The birefringent plate according to claim 7 further comprising a protective film formed on the obliquely deposited film for holding the occluded water within said obliquely deposited film.

9. The birefringent plate according to claim 8, wherein said protective film further reduces the light interference between the opposite surface of said glass substrate and the surface of said obliquely deposited film.

10. The birefringent plate according to claim 9, wherein said protective film is formed as a single-layered construction including a low refractive-index material which exhibits an optical film thickness $(2m-1)\lambda/4$ in which $m=1-5$ and $\lambda$ is the wavelength of a laser beam used for a phase-difference measurement.

11. The birefringent plate according to claim 10, wherein said low refractive-index material is at least one member selected from the group consisting of fluorocarbon, furan, NaF, $MgF_2$, $CaF_2$ and $SiO_2$.

12. The birefringent plate according to claim 9, wherein said protective film is formed as a more than one multi-layered construction including a high refractive-index material, which exhibits an optical film thickness $\lambda/2$ in which $\lambda$ is the wavelength of a laser beam used for a phase-difference measurement, and a low refractive-index material, which exhibits an optical film thickness $(2m-1)\lambda/4$ in which $m=1-5$ and $\lambda$ is the wavelength of a laser beam used for a phase-difference measurement.

13. The birefringent plate according to claim 12, wherein said high refractive- index material is at least one member selected from the group consisting of $Ta_2O_5$, $ZrO_2$, $CeO_2$ and $TiO_2$, and said low refractive-index material is at least one member selected from the group consisting of fluorocarbon, furan, NaF, $MgF_2$, $CaF_2$ and $SiO_2$.

14. The birefringent plate according to claim 1, wherein said protective film is formed of at least one member selected from the group consisting of fluorocarbon, furan and $SiO_2$.

* * * * *